United States Patent [19]

Nunn

[11] Patent Number: 5,048,900
[45] Date of Patent: Sep. 17, 1991

[54] GRINDER PLATES AND KNIVES STORAGE CABINET

[76] Inventor: Gene Nunn, P.O. #17867, San Antonio, Tex. 78217

[21] Appl. No.: 351,424

[22] Filed: May 12, 1989

[51] Int. Cl.⁵ .............................................. A47F 3/00
[52] U.S. Cl. .................................... 312/114; 312/229; 312/291
[58] Field of Search ............ 312/229, 291, 324, 138.1, 312/245, 114, 117

[56] References Cited

U.S. PATENT DOCUMENTS

| | | | |
|---|---|---|---|
| 655,116 | 7/1900 | Rand | 312/291 X |
| 1,313,865 | 8/1919 | Hahn | 312/118 X |
| 2,199,194 | 4/1940 | Cohen | 312/229 |
| 3,261,454 | 7/1966 | Elson et al. | 206/349 |
| 3,442,393 | 5/1969 | Koppelman | 312/280 X |
| 3,997,219 | 12/1976 | Phelps | 312/245 X |
| 4,324,446 | 4/1982 | LeSage | 312/245 |
| 4,334,724 | 6/1982 | Rogers | 206/349 X |
| 4,456,316 | 6/1984 | Lundgren | 312/229 |
| 4,756,582 | 7/1988 | Heien | 312/229 X |
| 4,767,166 | 8/1988 | Cohn et al. | 312/229 |
| 4,799,744 | 1/1989 | Toy | 312/229 |

Primary Examiner—Joseph Falk
Attorney, Agent, or Firm—Gunn, Lee & Miller

[57] ABSTRACT

A storage cabinet for grinder plates and knives is set forth particularly to be used in a butcher shop. Disk-like grinder plates and multi-edged rotary knives are stored on hooks in a housing having a front door, the door being supported by a long piano hinge at one end to hold the grinder plates and knives in view through a translucent window in said housing. A separate compartment with a separate door with separate hangers is included for dirty grinder plates and knives.

6 Claims, 2 Drawing Sheets

GRINDER PLATES AND KNIVES STORAGE CABINET

BACKGROUND OF THE DISCLOSURE

The present apparatus is directed to a storage facility and more particularly to a storage cabinet for grinder plates and knives. The type of grinder plate and knife that the present apparatus cooperates with is a circular grinder plate with evenly spaced holes extending through the grinder plate and a multi-edged rotary knife. The knife is equipped with central hole for mounting on a chuck or other drive. Moreover, the knife is constructed with cutting edges for its most common application in butcher shops and the like. It is particularly used in cutting animal carcasses to divide the carcass into smaller cuts like hamburger meat, sausage or chile which are readily sold for retail consumption. The knife has sharp, dressed, cutting edges which must be periodically dressed with whetstones or otherwise stropped on a leather surface. The grinder plate has a smooth surface, for cooperating with the knife to cut and grind the meat, which must also be periodically dressed so that the meat is ground efficiently. Dressing is normally carried out at a place remote from the butcher shop. Even where a large slaughter house is involved the grinder plates and knives are dressed elsewhere. They are normally delivered as part of a service which provides sharpened cutters. Grinder plates and knives are used until the blade is dull or the plate becomes pitted. In use, the grinder plates and knives become corroded or otherwise coated with fat particles and the like which requires special efforts in cleaning. Accordingly, the typical service will come to a butcher shop periodically, once every three or four months, pick up the old or dirty grinder plates and knives, remove them from the premises for subsequent dressing while simultaneously delivering a shipment of dressed grinder plates and knives. When delivered, the dressed grinder plates and knives are provided in a clean state, with all cutting edges sharpened so that the butcher at the butcher shop can retrieve a fresh grinder plate and knife and use them in meat processing. Each time a fresh grinder plate and knife is removed from inventory, the optimum procedure is to place a used or dirty grinder plate and knife in storage for the next use or next pick up and delivery.

A dressed grinder plate and knife includes sharpened metal edges which are susceptible to rust and corrosion. When delivered, they are preferably provided with a light coating of oil to protect from corrosion and rust. Even the smallest trace of rust at the cutting edge will dull the blade and thereby detract from the performance. The protection is therefore provided by means of a spray or the like which coats the cutting edges, and particularly the dressed surfaces. This coating is applied typically after each dressing and is typically in the form of a light oil such as a light food oil. Heavier weight oil can be used depending on temperatures. In any event, the critical surfaces of the grinder plate and knife, especially the edges are dressed so that protection is obtained. This protection means that the grinder plates and knives run the risk of dripping when stored. The present apparatus is a storage cabinet which is adapted to receive a number of grinder plates and knives, even though the cutters may drip. The storage cabinet provides secure protection for them so they can be properly inventoried.

The apparatus of the present disclosure is a cabinet which is covered by a front door. The cabinet includes appropriate hangers to store a specified quantity of grinder plates and knives. The grinder plates and knives are placed on the hangers. Moreover, the front door includes a transparent panel so the butcher can look into the cabinet to assure himself that sharp, fresh grinder plates and knives are available. The cabinet thus supports a plurality of hangers. The hangers support the several grinder plates and knives above the floor of the cabinet, and the floor is covered over by a removable drip tray. It is typically formed of impervious plastic material for easy removal, cleaning and restoration. Not only that, the cabinet includes a separate section where the used or dirty grinder plates and knives are stored. They are also placed on similar hooks.

The present apparatus is a storage cabinet adapted to be placed on the wall, has a generally rectangular configuration, and is closed by a front door. The door is mounted on a piano hinge along one edge, and includes a central opening which is covered over by a transparent pane. This permits a brief view of the grinder plates and knives which are stored on a set of hangers within the cabinet. Moreover, the cabinet is divided into two portions, one including hangers for the clean and fresh grinder plates and knives, and the other portion is separated by a partition which isolates hangers for the dirty grinder plates and knives. The two areas of the cabinet are transversely divided from one another. Across the bottom of the clean side, there is a tray for drippings. The clean grinder plates and knives run the risk of dripping a protective food oil coating. The tray can therefore be removed periodically for cleaning and is restored to storage.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention to other equally effective embodiments.

DETAILED DESCRIPTION OF THE PREFERRED EMBODIMENT

Figure 1:
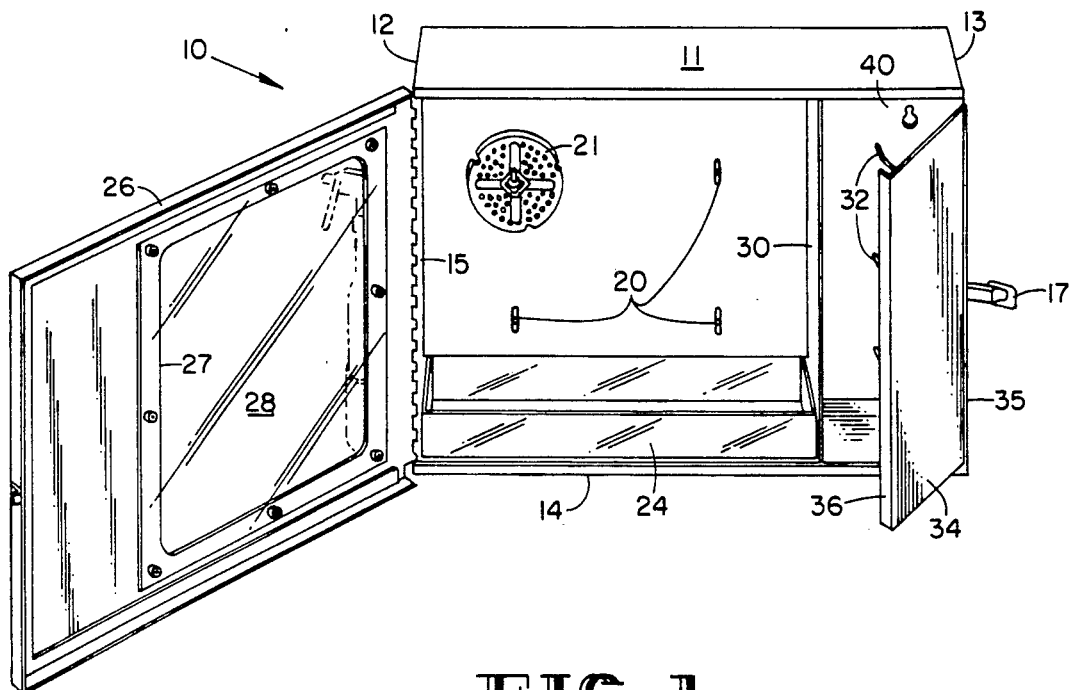
FIG. 1 shows the storage cabinet of the present disclosure with the front door opened and reveals internal details of hangers for storing several grinder plates and knives.

Attention is now directed to FIG. 1 of the drawings where the numeral 10 identifies the storage apparatus of the present disclosure. It is a rectangular cabinet incorporating a top 11, parallel end walls 12 and 13, and a bottom 14. It is constructed with a piano hinge 15 along one edge and a door 16 is mounted on the hinge. The door covers the entire front. The door swings open, rotating about the hinge 15. The door is held in the closed position by a latch 17 opposite the hinge 15. As noted in FIGS. 3 and 4, there is a back 18 which is parallel to the door 16 when closed.

Figure 2:
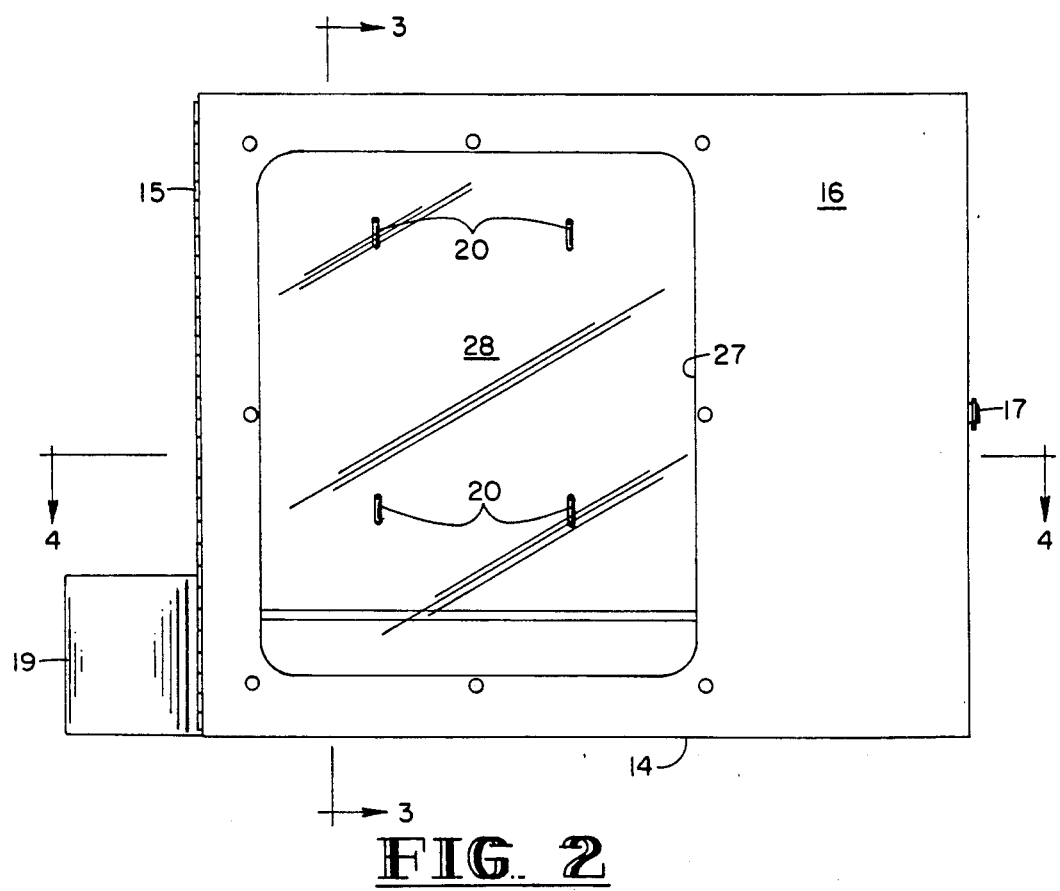
FIG. 2 is a front elevation view showing hangers for the grinder plates and knives where the hangers are deployed within view through a transparent pane.
Figure 3:
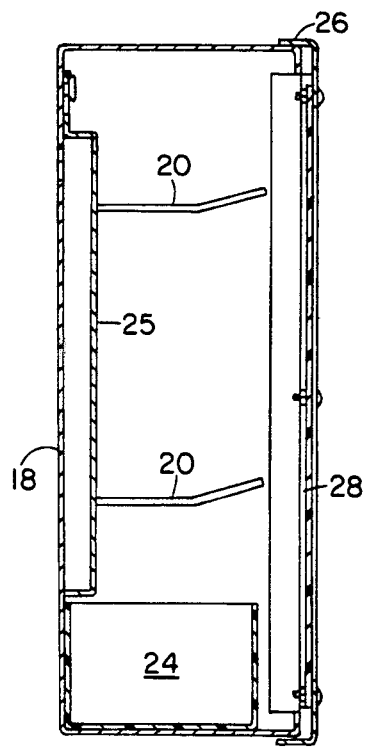
FIG. 3 is a sectional view taken along the line 3—3 of FIG. 2 showing internal details of construction of the hangers and the cabinet.
Figure 4:
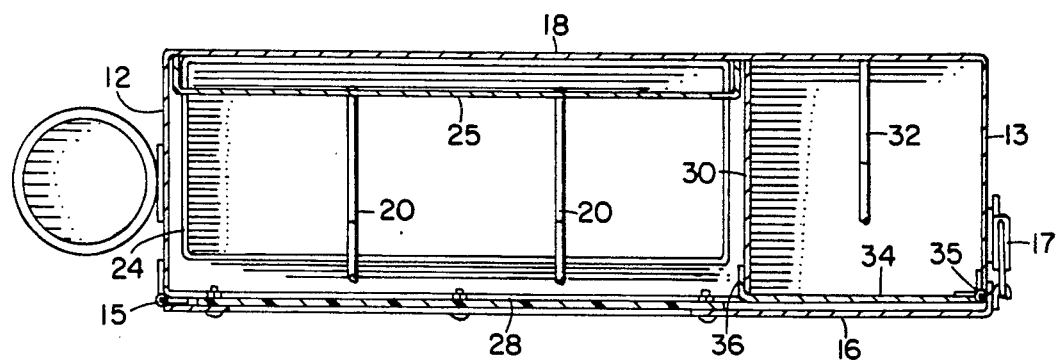
FIG. 4 is a sectional view taken along the line 4—4 of FIG. 2 showing additional details of the hangers in conjunction with the cabinet.

Continuing with FIGS. 1 and 2, the interior on the left incorporates several duplicate hangers 20. The hangers are deployed in spaced relationship to support a grinder plate and knife set 21. Speaking very generally, the grinder plate is circular disk and the knife is X-shaped with a central mounting hole for engaging a chuck or drive mechanism. The knife is multi-edged and is designed to be operated in a rotary fashion. The hangers are constructed in the form of protruding slightly bent posts as shown in FIG. 3, and they are adapted to support one or more grinder plates and knives thereon. The grinder plates and knives are simply slipped over the hangers and are supported until removed. The several hangers are deployed in a regular pattern and are spaced to assure that the grinder plates and knives 21 can be placed adjacent to one another without interference. Another facet of the construction of the hangers 2 is that they are located immediately above a removable drip pan 24. The pan 24 is rectangular and open across the top. It slides on the bottom 14. It is sized to fit snugly when inserted. The pan 24 has side walls which extend to a reasonable height to assure that any protective grease dripping from the grinder plates and knives will be caught and will not splatter elsewhere. A cup-like holder 19 may be attached to the cabinet 10 for storing a bottle or other container. This bottle ideally would have lubricating oil which could be sprayed on the stored grinder plates and knives periodically or when the grinder plates and knives are returned to the hangers 20 after use. The oil is USDA approved food oil. The oil pan 24 is filled with food oil so that the plates and knives can be sprayed or dipped into the oil for protection from rust.

In FIG. 3 of the drawings, the back 18 supports a removable parallel false wall 25. This positions the hangers 20 spaced from the back wall 18. Thus, the false wall 25 may well occasion protective oil dripping on the wall 25 from the grinder plates and knives and for that event, the false wall 25 is located over the pan 24. In other words, it serves as a spacer to hold the various grinder plates and knives out from the back wall to assure that any dripping grease falls into the pan without running down the back wall 18 and circumventing the protective pan 24. As shown in FIG. 3, the pan fits just under the false back wall 25. While the wall 25 serves as a spacer for the grinder plates and knives 21 supported on the hangers 20, it further also assists by directing any drippings into the pan.

Going now to FIG. 1 of the drawings, the door 16 is constructed with a lip 26 along the top edge which reaches over the top 11. So to speak, the door when closed slightly encircles or nests around the cabinet. In like fashion there are similar overhanging lips around the door 16. This therefore defines the door as having an internal or recessed cavity. It is constructed with a rectangular opening 27, and the opening 27 is covered by a transparent sheet 28. While glass can be used, it is preferable to use a shatterproof clear plastic material which can be periodically washed to assure that it remains transparent. It is mounted by appropriate bolts, and is supported adjacent a gasket (not shown) to provide a good seal. The opening 27 is sized so that the several hangers 20 can be seen through the transparent sheet member 28.

The door is relatively long, sufficient to span the full width of the cabinet. There is however a vertical divider 30 which defines and isolates the compartment for receiving the clean grinder plates and knives. There is a second and smaller compartment. It includes several hangers 32 for receiving dirty or used grinder plates and knives. The hangers 32 are deployed out of sight, and they are covered over by a separate short door 34. The door 34 is mounted on another piano hinge 35. The door 34 terminates at a lip 36 which hooks over the vertical wall 30. As shown in the sectional view of FIG. 4, the door 34 is closed first and the door 16 closes over it. If desired, a similar drip pan of proper length can be placed in the right side of the cabinet.

The present apparatus is installed on a wall by mounting bolts which pass through key hole shaped openings exemplified at 40 in FIG. 1. The apparatus is installed level. The door 16 is opened by releasing the latch 17, and the appropriate grinder plates and knives 21 are placed on the hangers 20. Once stored, they are mounted for easy removal from the hanger. The door is then closed, and they are accessible by the butcher when required. The butcher need only unlock the latch 17 and swing the door 16 open, rotating about the hinge 15. When opened, the butcher can then reach into the cabinet and retrieve one or more grinder plate and knife as needed. During the interval of storage, the grinder plate and knife may drip machine oil but that is caught in the removable and cleanable tray 24. This tray is included to serve as a catch basin. Moreover, should the drippings run down the adjacent wall 25, that is a false wall as shown at 25 in FIG. 3 and the drippings again will be recovered in the tray 24.

Periodically, the butcher may glance at the cabinet to see how many grinder plates and knives remain. The portion of the cabinet which is not visually subject to inspection is the area where the used grinder plates and knives are stored. That is isolated behind a door 34. It is also mounted on a hinge at 35 for opening and closing. It has the lip 36 which latches over the partition 30. This construction permits the dirty grinder plates and knives to be stored on the hangers 32. That is isolated behind the door 34. Isolation is helpful because there is some risk of the animal fat perhaps turning rancid, creating an odor. To that extent, this portion of the cabinet is isolated.

While the foregoing is directed to the preferred embodiment, the scope thereof is determined by the claims which follow.

What is claimed is:

1. For use at a butcher shop for storing grinder plates and knives for use in meat processing equipment, a storage cabinet which comprises:
   (a) a housing supporting a hinged door for opening and closing movement, said housing has a back wall and a parallel spaced false back wall set forwardly of said back wall and attached to said back wall along an upper edge of said false back wall;
   (b) hangers within said housing for receiving grinder plates and knives thereon, said hangers comprising individual, protruding, upwardly inclined wire hooks extending from said false back wall and further including means for spacing said hooks so that dripping material from the grinder plates and knives is directed away from said false back wall;

(c) a pan in the lower portions of said housing for collecting dripping material from grinder plates and knives placed in said housing, said pan being readily accessible when said door is open such that said collected material may be redeposited on said grinder plates and knives; and (d) means for temporarily closing said housing by closing the door thereof, said door having an opening therein for viewing grinder plates and knives stored within said housing, and further including a transparent pane closing said opening therein, said door also including a lip along said door positioned and sized to reach around said housing when said door is closed.

2. The apparatus of claim 1 wherein said housing includes a divider wall dividing said hangers into first and second hangers, wherein one of said hangers is designated for clean grinder plates and knives and the other is for grinder plates and knives that have been used, and further including a separate door for closing over used grinder plates and knives.

3. The apparatus of claim 2 wherein said separate door is covered by said hinged door.

4. The apparatus of claim 3 further including a piano hinge adjoining one edge of said housing for supporting said separate door.

5. The apparatus of claim 4 wherein a latch means is mounted on said peripheral lip for closing said housing door.

6. For use at a butcher shop for storing grinder plates and knives for use in meat processing equipment, a storage cabinet which comprises:

(a) a housing supporting a hinged door for opening and closing movement, said housing has a back wall and a parallel spaced false back wall set forwardly of said back wall and attached to said back wall along an upper edge of said false back wall;

(b) hangers within said housing for receiving grinder plates and knives thereon, said hangers comprising individual, protruding, upwardly inclined wire hooks extending from said false back wall, and further including means for spacing said hooks so that dripping material from the grinder plates and knives is directed away from said false back wall;

(c) a pan in the lower portions of said housing for collecting dripping material from grinder plates and knives placed in said housing, said pan being readily accessible when said door is open such that said collected material may be redeposited on said grinder plates and knives;

(d) means for temporarily closing said housing by closing the door thereof, said door having an opening therein for viewing grinder plates and knives stored within said housing, and further including a transparent pane closing said opening therein, said door also including a lip along said door positioned and sized to reach around said housing when said door is closed;

(e) a divider wall dividing said hangers into first and second hangers, wherein one of said hangers is designated for clean grinder plates and knives and the other is for grinder plates and knives that have been used, and further including a separate door for closing over used grinder plates and knives, wherein said separate door is covered by said hinged door; and (f) a latch means mounted on said peripheral lip for closing said housing door.

* * * * *